(12) United States Patent
Heikkilä et al.

(10) Patent No.: US 6,572,775 B2
(45) Date of Patent: *Jun. 3, 2003

(54) METHOD FOR FRACTIONATING A SOLUTION

(75) Inventors: Heikki Heikkilä, Espoo (FI); Göran Hyöky, Kantvik (FI); Jarmo Kuisma, Kantvik (FI); Hannu Paananen, Kantvik (FI)

(73) Assignee: Cultor Corporation, Helsinki (FI)

( * ) Notice: Subject to any disclaimer, the term of this patent is extended or adjusted under 35 U.S.C. 154(b) by 72 days.

This patent is subject to a terminal disclaimer.

(21) Appl. No.: 09/794,651

(22) Filed: Feb. 27, 2001

(65) Prior Publication Data

US 2001/0009236 A1 Jul. 26, 2001

Related U.S. Application Data

(63) Continuation of application No. 09/248,089, filed on Feb. 10, 1999, now Pat. No. 6,224,776, which is a continuation-in-part of application No. 08/861,613, filed on May 22, 1997, now abandoned.

(30) Foreign Application Priority Data

May 24, 1996 (FI) .................................................. 962204

(51) Int. Cl.$^7$ ............................................... B01D 15/08
(52) U.S. Cl. .................... 210/659; 210/198.2; 127/46.2
(58) Field of Search ............................... 127/46.1, 46.2, 127/46.3; 210/635, 656, 659, 672, 198.2

(56) References Cited

U.S. PATENT DOCUMENTS

| | | | |
|---|---|---|---|
| 2,007,971 A | 7/1935 | Jackson | 127/58 |
| 2,375,165 A | 5/1945 | Nees et al. | 562/514 |
| 2,519,573 A | 8/1950 | Hoglan | 562/514 |
| 2,524,414 A | 10/1950 | Wolfrom et al. | 127/34 |
| 2,586,295 A | 2/1952 | Brown et al. | 562/514 |
| 2,588,449 A | 3/1952 | Young et al. | 127/30 |
| 2,818,851 A | 1/1958 | Khym et al. | 127/55 |
| 2,845,136 A | 7/1958 | Robinson | 96/107 |
| 2,868,677 A | 1/1959 | Kopke | 127/463 |
| 2,890,972 A | 6/1959 | Wheaton | 127/463 |
| 2,937,959 A | 5/1960 | Reents et al. | 127/46.3 |
| 2,949,389 A | 8/1960 | Murtaugh et al. | 127/36 |
| 2,985,589 A | 5/1961 | Broughton et al. | |
| 3,021,374 A | 2/1962 | Radzitzky | |
| 3,044,904 A | 7/1962 | Serbia | |

(List continued on next page.)

FOREIGN PATENT DOCUMENTS

| | | |
|---|---|---|
| CA | 754511 | 3/1967 |
| DE | 2 300 492 | 7/1973 |
| DE | 23 62 211 | 6/1975 |

(List continued on next page.)

OTHER PUBLICATIONS

"Proceedings Of The Research Society Of Japan Sugar Refineries' Technologists", edited by The Research Institute Of The Japan Sugar Refiners' Association, vol. 27, Aug., 1977.

"Purification Of Sugar Products By The Ion Exclusion Process" by D. Gross of Tate & Lyle, Ltd., Research Centre, Keston, Kent, England; presented to the 14$^{th}$ General Assembly, C.I.T.S, Brussels, 1971.

Processing Equipment: "High–volume chromatography separates the 'hard to separate' organic compounds", *Food Engineering*, May, 1983.

(List continued on next page.)

*Primary Examiner*—Ernest G. Therkorn
(74) *Attorney, Agent, or Firm*—Scully, Scott, Murphy & Presser

(57) ABSTRACT

A method for fractionating a solution into two or more fractions by a chromatographic simulated moving bed (SMB) process, wherein the separation system comprises at least two separation profiles in the same loop.

12 Claims, 1 Drawing Sheet

U.S. PATENT DOCUMENTS

| | | |
|---|---|---|
| 3,044,905 A | 7/1962 | Lefevre |
| 3,044,906 A | 7/1962 | Lefevre |
| 3,134,814 A | 5/1964 | Sargent et al. |
| 3,174,876 A | 3/1965 | Stark |
| 3,214,293 A | 10/1965 | Mountfort |
| 3,230,167 A | 1/1966 | Golay |
| 3,250,058 A | 5/1966 | Baddour et al. |
| 3,268,605 A | 8/1966 | Boyd, Jr. .................... 210/662 |
| 3,298,527 A | 1/1967 | Wright |
| 3,305,395 A | 2/1967 | Scallet et al. |
| 3,374,606 A | 3/1968 | Baddour |
| 3,398,512 A | 8/1968 | Perkins, Jr. et al. |
| 3,407,574 A | 10/1968 | Perkins, Jr. et al. |
| 3,411,342 A | 11/1968 | Liermann |
| 3,416,961 A | 12/1968 | Mountfort et al. |
| 3,420,709 A | 1/1969 | Barrett, Jr. et al. |
| 3,436,897 A | 4/1969 | Crowley |
| 3,453,811 A | 7/1969 | Crowley |
| 3,468,607 A | 9/1969 | Sloane et al. |
| 3,471,329 A | 10/1969 | Quietensky et al. |
| 3,474,908 A | 10/1969 | Catravas |
| 3,479,248 A | 11/1969 | Nobile |
| 3,480,665 A | 11/1969 | Nagy |
| 3,483,031 A | 12/1969 | Lauer et al. |
| 3,493,497 A | 2/1970 | Pretorius et al. |
| 3,494,103 A | 2/1970 | Mir |
| 3,494,104 A | 2/1970 | Royer |
| 3,513,023 A | 5/1970 | Kusch et al. |
| 3,522,172 A | 7/1970 | Pretorius et al. |
| 3,539,505 A | 11/1970 | Lauer et al. |
| 3,558,725 A | 1/1971 | Kohno et al. |
| 3,579,380 A | 5/1971 | Friese |
| 3,607,392 A | 9/1971 | Lauer et al. |
| 3,619,369 A | 11/1971 | Onishi et al. |
| 3,632,656 A | 1/1972 | Unver |
| 3,692,582 A | 9/1972 | Melaja |
| 3,694,158 A | 9/1972 | Lauer et al. |
| 3,704,168 A | 11/1972 | Hara et al. |
| 3,706,812 A | 12/1972 | Derosset et al. |
| 3,730,770 A | 5/1973 | Zievers et al. |
| 3,732,982 A | 5/1973 | Dunnill et al. |
| 3,743,539 A | 7/1973 | Kroyer et al. |
| 3,756,855 A | 9/1973 | Duchateau et al. |
| 3,796,657 A | 3/1974 | Pretorius et al. |
| 3,814,253 A | 6/1974 | Forsberg |
| 3,817,787 A | 6/1974 | Hertzen et al. |
| 3,826,905 A | 7/1974 | Valkama et al. |
| 3,835,043 A | 9/1974 | Geissler et al. |
| 3,884,714 A | 5/1975 | Schneider et al. |
| 3,928,062 A | 12/1975 | Yamauchi |
| 3,928,193 A | 12/1975 | Melaja et al. |
| 3,959,519 A | 5/1976 | Johnson |
| 3,982,003 A | 9/1976 | Mitchell et al. |
| 4,001,112 A | 1/1977 | Barker et al. |
| 4,008,285 A | 2/1977 | Melaja et al. |
| 4,075,406 A | 2/1978 | Melaja et al. |
| 4,096,036 A | 6/1978 | Liu et al. |
| 4,143,169 A | 3/1979 | Skoch et al. |
| 4,145,230 A | 3/1979 | Madsen et al. |
| 4,157,267 A | 6/1979 | Odawara et al. |
| 4,182,633 A | 1/1980 | Ishikawa et al. |
| 4,208,284 A | 6/1980 | Pretorius et al. |
| 4,218,438 A | 8/1980 | Callender et al. |
| 4,259,186 A | 3/1981 | Boeing et al. |
| 4,267,054 A | 5/1981 | Yoritomi et al. |
| 4,293,346 A | 10/1981 | Landis et al. |
| 4,312,678 A | 1/1982 | Landis |
| 4,313,015 A | 1/1982 | Broughton |
| 4,332,623 A | 6/1982 | Ando et al. |
| 4,359,430 A | 11/1982 | Heikkila et al. |
| 4,366,060 A | 12/1982 | Leiser et al. |
| 4,368,268 A | 1/1983 | Gong |
| 4,379,751 A | 4/1983 | Yoritomi |
| 4,391,649 A | 7/1983 | Shimizu et al. |
| 4,402,832 A | 9/1983 | Gerhold |
| 4,404,037 A | 9/1983 | Broughton |
| 4,405,455 A | 9/1983 | Ando et al. |
| 4,412,366 A | 11/1983 | Rock et al. |
| 4,412,866 A | 11/1983 | Schoenrock et al. |
| 4,426,232 A | 1/1984 | Neuzil et al. |
| 4,451,489 A | 5/1984 | Beale et al. |
| 4,461,649 A | 7/1984 | Neuzil et al. |
| 4,482,761 A | 11/1984 | Chao et al. |
| 4,498,991 A | 2/1985 | Oroskar |
| 4,518,436 A | 5/1985 | van der Poel |
| 4,519,845 A | 5/1985 | Ou |
| 4,533,398 A | 8/1985 | Neuzil et al. |
| 4,599,115 A | 7/1986 | Ando et al. |
| 4,631,129 A | 12/1986 | Heikkila |
| 4,636,315 A | 1/1987 | Allen, Jr. |
| 4,666,527 A | 5/1987 | Ito et al. |
| 4,724,006 A | 2/1988 | Day |
| 4,732,687 A | 3/1988 | Muller et al. |
| 4,837,315 A | 6/1989 | Kulprathipanja |
| 4,857,642 A | 8/1989 | Kulprathipanja |
| 4,873,111 A | 10/1989 | Aaltonen et al. |
| 4,938,804 A | 7/1990 | Heikkila et al. |
| 4,938,974 A | 7/1990 | Bichsel et al. ................. 426/74 |
| 4,955,363 A | 9/1990 | Harju et al. |
| 4,970,002 A | 11/1990 | Ando |
| 4,976,865 A | 12/1990 | Sanchez et al. |
| 4,980,277 A | 12/1990 | Junnila |
| 4,990,259 A | 2/1991 | Kearney et al. |
| 5,032,156 A | 7/1991 | Luder et al. |
| 5,043,171 A | 8/1991 | Bichsel et al. ................. 127/74 |
| 5,081,026 A | 1/1992 | Heikkila et al. |
| 5,084,104 A | 1/1992 | Heikkila et al. |
| 5,102,553 A | 4/1992 | Kearney et al. |
| 5,122,275 A | 6/1992 | Rasche |
| 5,124,133 A | 6/1992 | Schoenrock |
| 5,127,957 A | 7/1992 | Heikkila et al. |
| 5,177,008 A | 1/1993 | Kampen ..................... 435/139 |
| 5,198,120 A | 3/1993 | Masuda et al. |
| 5,382,294 A | 1/1995 | Rimedio et al. .............. 127/42 |
| 5,384,035 A | 1/1995 | Smolnik et al. ............ 210/635 |
| 5,387,347 A | 2/1995 | Rothchild |
| 5,482,631 A | 1/1996 | Sasaka et al. |
| 5,494,525 A | 2/1996 | Heikkila et al. |
| 5,637,225 A | 6/1997 | Heikkila et al. |
| 5,730,877 A | 3/1998 | Heikkila et al. |
| 5,770,061 A | 6/1998 | Heikkila et al. |
| 5,773,052 A | 6/1998 | Virtanen et al. |
| 5,795,398 A | 8/1998 | Hyoky et al. |
| 6,093,326 A | 7/2000 | Heikkila et al. ............ 210/659 |
| 6,187,204 B1 | 2/2001 | Heikkila et al. ............ 210/659 |

FOREIGN PATENT DOCUMENTS

| | | |
|---|---|---|
| DE | 25 11 904 | 9/1976 |
| DE | 40 41 414 A1 | 6/1991 |
| EP | 0 010 769 A2 | 5/1980 |
| EP | 0 054 544 B1 | 6/1982 |
| EP | 0 101 304 A2 | 2/1984 |
| EP | 0 279 946 A2 | 8/1988 |
| EP | 0 345 511 A3 | 12/1989 |
| EP | 0 663 224 A1 | 7/1995 |
| FI | 68526 | 6/1985 |
| FI | 75503 | 3/1988 |
| FI | 77845 | 1/1989 |
| FI | 86416 | 5/1992 |
| FI | 875655 | 6/1998 |
| GB | 715774 | 9/1952 |

| | | |
|---|---|---|
| GB | 1326765 | 9/1970 |
| GB | 1 448 524 | 9/1976 |
| GB | 240 053 A2 | 7/1991 |
| JP | 39-5429 | 4/1964 |
| SU | 445270 | 6/1976 |
| SU | 1072818 A | 2/1981 |
| WO | WO 81/00014 | 1/1981 |
| WO | WO 81/02420 | 9/1981 |
| WO | WO 82/04265 | 12/1982 |
| WO | WO 91/08815 | 6/1991 |
| WO | WO 94/17213 | 8/1994 |
| WO | WO 98/30724 | 7/1998 |
| WO | WO 98/32514 | 7/1998 |
| ZA | 97/4203 | 2/1998 |

OTHER PUBLICATIONS

"Simultaneously Continuous Separation of Glucose, Maltose, and Maltotriose Using a Simulated Moving–Bed Adsorber "by Kyu Beom Kim, Shiro Kishihara, and Satoshi Fujii of The Graduate School of Science and Technology, Kobe University, I, Rokkadai, Nada–ku, Kobe 657, Japan Received Sep. 2, 1991.

Chromatographic Separation: "A Sequential Chromatographic Process for the Separation of Glucose/Fructose Mixtures", by P. E. Barker, C. H. Chuah of the Chemical Engineering Department, University of Aston in Birmingham, Gosta Green, Birmingham, *The Chemical Engineer,* (Aug./Sep. 1981), pp. 389–393.

"On The Utilization Of Betaine From Sugar Beets"by J.P. Dubois, Raffinerie Tirlementoise, s.a., D–3300 Tienan (Belgium).

S.I.T. Paper #649: "An Audubon Sugar Institute–Applexion Process For Desugarization Of Cane Molasses", by M. Saska, Ch. Pelletan, Mei Di Wu and X. Lancrenon, presented at the 1993 Sugar Industry Technologists Meeting, Jun. 13–16, 1993, Toronto Ontario.

S.I.T. Paper #428: "Liquid Sugar From The Chromatographic Molasses Desugarization Process "by H. J. Hongisto, Finnish Sugar Co., Ltd., Kantvik, Finland, vol. XXX-VIII, publication of Technical Papers and Proceedings of the 38$^{th}$ Annual Meeting of Sugar Industry Technologists, Inc, Boston, Massachusetts, May 6–9, 1979.

"Desugarisation of Cane Molasses By the Finnsugar Chromatographic Separation Process", By H. Hongisto and H. Heikkila, reprint ISSCT (1977).

"Beet Sugar"by Michael Cleary of Imperial Holly Corporation appearing in Kurk–Othmer, *Encyclopedia Of Chemical Technology,* Fourth Edition, vol. 23, published by John Wiley & Sons, Wiley–Interscience (1997).

Process Technology: "Separating Sugars And Amino Acids With Chromatography", by Heikki Heikkila, Finnish Sugar Co., Ltd., *Chemical Engineering* Jan. 24, 1983, pp. 50–52.

"Trends In The Chromatographic Separation Of Molasses", by Hannu A. Paananen, *Zuckerind 122* (1997) Nr. 1, pp. 28–33.

"Engineering Analysis Of Ion Exclusion For Sucrose Recovery rom Beet Molasses, Part 1 Experimental Procedures And Data Reduction Techniques"by W.G. Schultz, J. B. Stark and E. Lowe, Western Regional Research Laboratory, Western Utilization Research And Development Division, Agricultural Research Service, U.S. Department of Agriculture, Albany, California, 94710 U.S.A., published in the *International Sugar Journal,* Feb., 1967.

"Engineering Analysis Of Ion Exclusion For Sucrose Recovery From Beet Molasses, Part II Data Analysis And Cost Projection"by W.G. Schultz, J. B. Stark and E. Lowe, Western Regional Research Laboratory, Western Utilization Research And Development Division, Agricultural Research Service, U.S. Department of Agriculture, Albany, California, 94710 U.S.A., published by the *International Sugar Journal,* Apr., 1967.

S.I.T. Paper 373: "The Recovery Of Sugar From Beet Molasses By Ion Exclusion", by James F. Zieverz and C. J. Novotny, Industrial Filter & Pump Mfg. Co., Cicero, Illinois.

"Recovery Of Sugar From Beet Molasses By The P. & L. Exclusion Process", by H. G. Schneider and J. Mikule of Pfiefer & Langen, Euskirchen, Germany, published in the *International Sugar Journal,* Part I, pp. 259–264, Sep. 1975.

"Recovery of Sugar From Beet Molasses by The P. & L. Exclusion Process", by H.G. Schneider and J. Mikulse of Pfeifer & Langen, Euskirchen, Germany, published in the *International Sugar Journal,* Part II, pp. 294–298, Oct., 1975.

Chromatographic Separation of Sugar Solutions: "The Finnsugar Molasses Desugarization Process", Part II, by H. J. Hongisto, Technical Department, Finnish Sugar Company, Ltd., Kantvik, Finland, published by the *International Sugar Journal,* May 1977, pp. 132–134.

"Trends In The Chromatographic Separation Of Molasses", by Hannu A. Paananen of Cultor Ltd., Finnsugar Bioproducts, Helsinki, Finland, Proceedings of the Workshop on Separation Process in the Sugar Industry, New Orleans, Apr., 1996, pp. 100–119.

ARi: "Coupled Loop Chromatography"by Mike Kearney of Amalgamated Research, Inc., presented at the 29$^{th}$ General Meeting, American Society of Beet Sugar Technologists, Mar. 1977.

"Simulated Moving–Bed Technology In The Sweetener Industry", by D. Eugene Rearick, Michael Kearney, and Dennis D. Costesso of Amalgamated Research, Inc., published in *Chemtech,* vol. 27, No. 9, pp. 36–40.

"Desugarisation Of Beet Molasses By the Finnsugar Chromatographic Separation Process", by H. Hongisto, Finnsugar Engineering.

SPRI: "Trends In The Chromatographic Separation of Molasses", by Hannu A. Paananen of Cultor, Ltd., Finnsugar Bioproducts, Helsinki, Finland, presented at the Proceedings of the 1996 Workshop on Separation Process in the Sugar Industry.

"The Recovery Of Sugar From Beet Molasses By the P. & L. Exclusion–Process", by H. G. Schneider and J. Mikule of Pfeifen & Lange, Euskirchen, Germany.

"Engineered Fractal Cascades For Fluid Control Applications"Mike Kearney of Amalgamated Research, Inc., Twin Falls, Idaho.

"Control Of Fluid Dynamics with Engineered Fractal Cascades–Adsorption Process Applications", by Mike Kearney, Director, New Technology, Amalgamated Research Inc., Twin Falls Idaho 1997.

"Molasses Exhaustion Session", Keynote Speech Summary, by Mike Kearney, Director, New Technology, Amalgamated Research Inc., published by *British Sugar EuroTechLink 97, England.*

"Multicomponent Separation Using Simulated Moving Bed Chromatography", by V. Kochergin and M. Kearney of Amalgamated Research, Inc., presented at AIChE Annual Meeting, Los Angeles, Nov. 16–21, 1997, Novel Adsorption–Based Separation Equipment Configuration, AIChE Proceedings, Part 2, pp. 1539–1544.

"Molassesdesugarization with Liquid Distribution Chromatography", by Dr. Mohammad Munir, Zentral–Laboratorium dor Suddautschen Zucker–Aktiengesollschaft, presented at 15$^{th}$ General Assembly of Commission Internationale Technique de Sucrerie, Vienna, Austria, May 12–16, 1975.

"Ion Exclusion . . . an overlooked ally", by James F. Zievers, C. J. Novotny, and E. A. Selvick of Industrial Filter and Pump Mfg. Co., Cicero, Illinois, published in *The Sugar Journal*, Feb., 1972, pp. 7–10.

"Ion Exchange For Desugaring Of Molasses And Byproduct Sugarbeet and Sugercane", by L.H. Ramm–Schmidt, published by B. V. Amaterdam, 1988, printed in Netherlands, pp. 111–126.

"Application Of The Finnsugar–Pfeifer & Langen Molasses Desugarisation Process In A Beet Sugar Factory", by H. J. Hongisto and P. Laakso.

"The Removal Of Color From Sugar Solutions By Adsorbent Resins", by R. I. M. Abrams, Technical manager of Duplite Ion Exchange Resins, Diamond Shamrock Chemical Company, Redwood City, California, published in *Sugar y Azuca*, 1971, pp. 31–34.

"Simulated Moving Bed Technology Applied To The Chromatographic Recovery Of Sucrose From Sucrose Syrups", by Mike Kearney of The Amalgamated Sugar Company, Twin Falls, Idaho, presented at Conference on Sugar Processing Research, Fiftieth Anniversary Conference, San Francisco, California, May 29–Jun. 1, 1990.

Ion Exclusion—An Overlooked Ally: "Ion Exclusion Ion Exclusion Experiments", by James F. Zievers, C. J. Novotny, and E. A. Selvick of Industrial Filter and Pump Mfg. Co., Cicero, Illinois, Oct. 4, 1970, pp. 12–24.

"Separation Processes In The Sugar Industry", by Sugar Processing Research Institute, Inc., New Orleans, Louisiana, presented at Proceedings of S.P.R.I. Workshop on Separation Processes In the Sugar Industry, Workshop Panel Discussion–Day 1, Oct. 1996, pp. 151–153.

"New Developments In The Chromatographic Desugarisation Of Beet Molasses", by Francois Rouseet, Applexion, France, published by British Sugar EuroTechLink97, York England.

"Chromatographic Separation Of Sugar Solutions The Finnsugar Molasses Desugarization Process", by H. J. Hongisto, Technical Department, Finnish Sugar Company, Ltd., Kantvik, Finland, presented to the 23$^{rd}$ Tech. Conf., British Sugar Corp. Ltd, 1976, Part I published in *International Sugar Journal*, Apr. 1977, pp. 100–104.

"Chromatographic Separation Of Sugar Solutions The Finnsugar Molasses Desugarization Process", by H. J. Hongisto, Technical Department, Finnish Sugar Company, Ltd., Kantvik, Finland, presented to the 23$^{rd}$ Tech. Conf., British Sugar Corp. Ltd, 1976, Part II published in *International Sugar Journal*, Apr. 1977, pp. 131–134.

"Ion Exclusion Purification Of Sugar Juices", by Lloyd Norman, Guy Rorabaugh, and Harold Keller, Research Laboratory Manger and General Chemist, Director of Research, Holly Sugar Corporation and Assistant Director, Illinois Water Treatment Company, published by *Journal of A. S. S. B. T.*, vol. 12, No. 5, Apr., 1963, pp. 362–370.

"Chemical Educators Stress Industry Ties"by Ward Worthy and Richard J. Seltzer of C&EN Washington, published Oct. 6, 1975, *C& EN*.

"Adsorption Separates Xylenes"by Seiya Otani of Toray Industries, Inc., published by *Chemical Engineering*, Sep. 17, 1973.

"Designing Large–Scale Adsorptive Separations"by E.N. Lightfoot, S.J. Gibbs, A.M. Athalye and T.H. Scholten of Department of Chemical Engineering, University of Wisconsin, Madison, WI., published *Israel Journal of Chemistry*, vol. 30, 1990, pp. 229–237.

"Continuous Chromatographic Separation Of Fructose/Glucose"by Tetsuya Hirota of Mitsubishi Chemical Industries, Ltd., published *Sugar y Azucar* Jan. 1980.

"Mechanism Of The Separation Of Glucose And Fructose On A Strong–Acid Cation Exchanger"by Charles A. Sauer of Applications Development, Duolite International, Inc., a subsidiary of Diamond Shamrock Corporation, Apr. 23, 1981.

"High Purity Fructose Via Continuous Adsorptive Separation"by D.B. Broughton, H.J. Bieser, R.C. Berg, E.D. Connell, D.J. Korous, and R.W. Neuzil of UOP, Inc., published *La Sucrerie Belge*, vol. 96–Mai 1977, pp. 155–162.

"Large–Scale Chromatography: New Separation Tool"by R.S. Timmins, L. Mir, and J.M. Ryan of Abcor, Inc., published by *Chemical Engineering*, May 19, 1969, pp. 170–178.

"The Tasco Chromatographic Separator At Twin Falls Factory"by K. P. Chertudi of The Amalgamated Sugar Company, published by *International Sugar Journal*, 1991, vol. 93, No. 1106.

"The Amalgamated Sugar Company Raw Juice Chromatographic Separation Process"by Mike Kearney and D. Eugene Rearick of The Amalgamated Sugar Company Research Laboratory, Twin Falls, Idaho, presented at 1995 C.I.T.S. 20$^{th}$ General Assembly, Munich, Germany, Jun., 1995.

"Production Of Raffinose: A New By–Product Of the Beet Sugar Industry"by K. Sayama, T. Kamada, and S. Oikawa of Nippon Beet Sugar Mfg Co Ltd., Japan, presented at British Sugar plc Technical Conference Eastbourne, 1992.

"Continuous Chromatographic Separation of Sucrose, Glucose and Fructose Using a Simulated Moving–Bed Adsorber"by S. Kishihara, S. Fujii, H. Tamaki, K.B. Kim, N. Wakiuchi, and T. Yamamoto, Int. Sugar Jnl., 1992, vol. 94, No. 112B.

"Presentation of the FAST Separation Technology" by Göran Hyoky, Hannu Paananen, Gary Cornelius and Michel Cotillon.

Abstract of "Contribution To The Biochemistry And Use Of The Beet Constituent Betaine.,"Von W. Steinmetzer 25 (1972) Nr. 2, pp. 48–57. Month N/A.

Finnsugar Bioproducts, Inc. v. The Amalgamated Sugar Company, LLC, et al., Civil Action No. 97–C–8746 (N.D. Ill)—Answer and Counterclaims to the Amended and Supplemental Complaint of the Amalgamated Sugar Company, LLC and Amalgamated Research, Inc.

"The Development and Application of Continuous Ion Exclusion"by Karl W.R. Schoenrock of The Amalgamated Sugar Company, presented to the 18th General Assembly, Commission International De Sucrerie, Ferrara, Jun. 8–12, 1987.

*Molasses Separation at SMSC*, Feb. 18, 1991 (F43325–F43329) (see 43328).

Cultor Travel/Meeting Report *Preliminary Cost Estimate for Crystalline Betaine Production,* by Peter Norman, Jun. 8, 1989 (F49931–F49936).

Cultor Ltd. Finnsugar Bioproducts *Visit Report,* by Kaj–Erik Monten, Jul. 15, 1991 (F36461–F36469).

SMBSC/Cultor Joint Research Project, *Research Schedule,* for Mar.–Jun. 1993 by Goran Hyoky updated Mar. 17, 1993.

Finnsugar Report, *Betaine Separation in Renville Preliminary Investment Costs,* by Peter Norman, Mar. 7–8, 1993 (F44079–F44082).

Technical Report 8: *Alternative Separation Methods* by Goran Hyoky, Jan. 21, 1994.

*The Development and Application of Continuous Ion Exclusion* by Karl W.R. Schoenrock of the Amalgamated Sugar Company, presented to the 18th General Assembly, Commission International De Sucrerie, Ferrara, Jun. 8–12, 1987.

*Some Technical and Economic Aspects of The Chromatographic Separation of Sugar Solutions* by H. Hongisto, Finnish Sugar Company Ltd. presented to British Sugar Corporation Ltd. $23^{rd}$ Technical Conference in Eastbourne, Jun. 1976.

*Large–Scale Adsorption and Chromatography,* vol. I, by Phillip C. Wankat, published by CRC Press, Inc., pp. 1–5, 1986.

*Large–Scale Adsorption and Chromatography,* vol. II, by Phillip C. Wankat, published by CRC Press, Inc., pp. 1–113, 1986.

*Ion Exclusion Purification of Molasses* by J.B. Stark, 1964.

*Purolite Chromatographic Ion–exchange Resins.*

South Minnesota Beet Sugar Cooperative *Separation Process Training* by Goran Hyoky, Feb. 1992 (F37933–F37985).

Cultor Ltd. *Operation Manual* for the Cultor/Finnsugar Molasses, Southern Minnesota Beet Sugar Cooperative, by Goran Hyoky and Esko Varteva, Nov. 6, 1989, as revised Jul. 20, 1992, (Zitterkopf Exhibit 3) (F44355–F44397).

Cultor Ltd. *Separation Program,* One Step Separation Sequence in SMS, Two Step Separation Sequence for Western Sugar, By Jarmo Kuisma, May 25, 1993 (Hyoky Exhibit 15) (F45859–F45892).

Cultor Ltd. *Program for New Looping* by Goran Hyoky, May 8, 1992 (Hyoky Exhibit 16) (F44085–F44086).

Cultor Ltd. *Program for New Looping (Two Phase Process)* by Goran Hyoky, Jul. 8, 1992 and cover letter (Hyoky Exhibit 17) (F44273–F44274).

*Molasses and Betaine SMB Separation Daily Material Balance,* accompanied by Charts: *Betaine Separation In Renville, Preliminary Investment Cost,* by Peter Norrman of Finnsugar Ltd., Mar. 7, 1993, with cover letter of Mar. 8, 1993 (F36351–F36356 and F36360–F36363).

*Weekly Reports* 1/93–49/94 by Goran Hyoky for SMBSC/Cultor Joint Research Project, Mar. 18, 1993 through Feb. 13, 1994 (Zitterkopf Exhibit 5) (F45237–F45202).

*Technical Report 4/93* by Goran Hyoky for SMBSC/Cultor Joint Research Project, Aug. 13, 1993 (F45063–F45082).

*Technical Report 5/93* by Groan Hyoky for SMBSC/Cultor Joint Research Project, Sep. 28, 1993 (F38197–F38202).

*Technical Report 6/93* by Goran Hyoky for SMBSC/Cultor Joint Research Project, Oct. 28, 1993 (F45113–F45121).

Cultor Ltd. Finnsugar Bioproducts *Trip Report* Southern Minnesota Sugar Beet Cooperative by Kaj–Erik Monten, Apr. 23, 1993 with Diagram: *Molasses and Betaine SMB Separation Daily Material Balance* And Chart: *Betaine Separation at SMSC, Renville, Preliminary Calculation* by Kaj–Erik Monten, Apr. 10, 1993 (F36339–F36347).

*Research Program* updated May 17, 1993 with Research Schedule by Goran Hykoy for SMSBC/Cultor Joint Research Project (Hyoky Exhibit No. 3) (F035514–F035521).

*SMSC Certificate of Performance* with cover letter from Kaj–Erik Monten, Jun. 14, 1993 (Monten Exhibit No. 13) (F36555–F36557).

*Sucrose Fraction Polishing* by Goran Hyoky, Jun. 28, 1993 (Hyoky Exhibit No. 4) (F38220–F38231).

Cultor Ltd. *Research Plan* for SMB Separation Test/SMSC Betaine Fraction, by J. Rinne, Nov. 15, 1993 (F035414–F035415).

Finnsugar Development Report for SMB Separation Test/SMBSC Betaine Fraction, by Jukka Rinne, Dec. 24, 1993 (F035391–F035395).

Finnsugar Ltd. Report with schematic diagram of steps used in the SMSC betaine separation of the pilot scale SMB system; Chart of No Secondary Separation; Charts with Secondary Separation; Graph of Concentration Gradient; Tables of Test Runs; and Charts with Material Balances; by Jukka Rinne, Dec. 28, 1993 (F80090–F80102).

Finnsugar Report with charts, graphs, and diagram of steps used with the SMSC–betaine separation on the pilot scale SMB system, by Jukka Rinne, Dec. 28, 1993 (F80103–F80164).

Joint Research Report for Southern Minnesota Beet Sugar Cooperative and Cultor/Finnsugar Bioproducts, Inc., by Goran Hyoky and Jean–Pierre Monclin, Jan. 1994 (Kuisma Exhibit No. 7) (F36617–F36646).

Answer and Counterclaims of Defendants Amalgamated Sugar Company and ARI to the Amended and Supplemental Complaint, Jan. 12, 1999.

Answer and Counterclaims of Defendant Raytheon Engineers & Constructors, Inc. to the Complaint, Oct. 16, 1998.

Defendant's Response to Finnsugar's Interrogatories Regarding The '398 Patent dated Nov. 3, 1999.

Affirmative Expert Disclosure of Dr. Michael Cleary dated Sep. 21, 1999.

Rebuttal Expert Disclosure of Dr. Michael Cleary dated Oct. 12, 1999.

Defendant ARI's Response to Finnsugar's Motion For Preliminary Injunction dated Jun. 1, 1999.

Rule 56.1(a)(3) Statement of Facts in Support of Defendants' Motion for Summary Judgment for Invalidity of the '398 Patent Under the §102(b) "On Sale" Bar dated Nov. 15, 1999.

Memorandum in Support of Defendants' Motion for Summary Judgment for Invalidity of the '398 Patent Under the §102(b) "On Sale" Bar dated Nov. 15, 1999.

Statement of Facts in Support of Defendants' Motion for Summary Judgment for Invalidity of the '398 Patent for Obviousness under §103 dated Nov. 15, 1999.

Memorandum in Support of Defendants' Motion for Summary Judgment for Invalidity of the '398 Patent for Obviousness under §103 dated Nov. 15, 1999.

"Continuous Chromatographic Separation of Sucrose, Glucose and Fructose Using a Simulated Moving–Bed Adsorber" by S. Kishihara, S. Fujii, H. Tamaki, K.B. Kim, N. Wakiuchi, and T. Yamamoto, published in the *International Sugar Journal,* vol. 94, No. 1128, 1992.

*Memorandum Opinion and Order* of Mar. 28, 2001 ("Opinion") in the Lawsuit, Finnsugar Bioproducts, Inc. v. The Amalgamated Sugar Company, No. 97–C–8746 (N.D. Ill.).

*Memorandum Opinion and Order* ("Supplemental Opinion") of Mar. 26, 2002 in the Lawsuit, *Finnsugar Bioproducts, Inc. v. The Amalgamated Sugar Company,* No. 97–C–8746 (N.D. Ill.).

METHOD FOR FRACTIONATING A SOLUTION

RELATED APPLICATIONS

This application is a continuation of U.S. application Ser. No. 09/248,089 filed on Feb. 10, 1999 now U.S. Pat. No. 6,224,776, which is a continuation-in-part application of U.S. application Ser. No. 08/861,613, filed May 22, 1997, now abandoned.

FIELD OF THE INVENTION

The present invention relates to a method for fractionating a solution into two or more fractions enriched with different components. In particular, the present invention relates to a method for fractionating a solution by a chromatographic simulated moving bed (SMB) process in which the liquid flow is effected in a chromatographic system comprising one or more columns containing one or more partial packed beds. The dissolved substances present in the feedstock are separated in the partial packed beds, and a separation (i.e. dry solids) profile is formed. The columns/partial packed beds of the chromatographic system form one or more loops. The novel separation system of the present invention comprises at least two separation profiles in the same loop. A separation profile is formed by the feed solution and the dry substance recirculated. The separation profile is a complete or an essentially complete dry solids profile.

In accordance with the method of the present invention, two or more profiles of dissolved material (dry solids profiles) are moving in the entire resin bed (all columns in the loop). This is different from prior art SMB methods wherein only one profile moves through the loop of the chromatographic system at any one time.

The chromatographic SMB method of the present invention enables a more efficient use of the resin, resulting in higher capacity at a given product recovery, purity and resin volume or alternatively, higher product purity is achieved at the same capacity as in prior processes.

Fractionation of a solution comprising many dissolved substances into fractions enriched with different components is often necessary in order to recover the desired components optimally pure. The method of the present invention can be employed to carry out such fractionation. A sulphite cooking liquor, for instance, can be fractionated by the present method so as to give a fraction rich in monosaccharides and/or a fraction rich in lignosulphonates. Furthermore, molasses or vinasse can be fractionated in this way to obtain fractions rich in a sugar, such as sucrose, and/or betaine, for instance.

The method of the present invention is particularly well suitable for separating substances that are difficult to separate from mixtures containing them. Such mixtures include fructose/glucose syrups, beet-derived juices, invert sugar mixtures, starch hydrolysates, wood hydrolysates, milk whey solutions and other lactose-containing solutions, solutions containing amino acids, fermentation broths containing various organic acids, such as citric acid, bagasse hydrolysates, and particularly solutions containing inositol, mannitol, sorbitol, xylitol, erythritol, glutamic acid and/or glycerol.

BACKGROUND OF THE INVENTION

Continuously operated chromatographic separation processes presently commonly employ the simulated moving bed method, which is used in a variety of different applications. The simulated moving bed method may be sequential or continuous or comprise a combination of a continuous and a sequential method.

In a continuous simulated moving bed process, all fluid streams typically flow continuously. The streams are: the supply of feed solution and eluent, the circulating of the liquid mixture, and the withdrawal of products. The flow rate for these flows may be adjusted in accordance with the separation goals (yield, purity, capacity). Normally 8 to 20 partial packed beds are combined into a loop. The eluent and feed supply and product withdrawal points are shifted cyclically in the downstream direction in the packing material bed. On account of the supply of eluent and feed solution, the withdrawal of products, and the flow through the packing material bed, a dry solids profile is formed in the packing material bed. Constituents having a lower migration rate in the packed bed are concentrated in the back slope of the separation profile, i.e. dry solids profile, while constituents having a higher migration rate are concentrated in the front slope. The points of introduction of the feed solution and eluent and the withdrawal points of the product or products are shifted cyclically at substantially the same rate at which the dry solids profile moves in the packing material bed. The eluent and feed supply and product withdrawal points are shifted cyclically by using feed and product valves located along the packing material bed, typically at the upstream and downstream end of each partial packed bed. If product fractions of very high purity are desired, short cycle times and multiple partial packed beds must be employed (the apparatus has the requisite valves and feed and withdrawal equipment).

In the sequential simulated moving bed process, some of the fluid streams do not flow continuously. The streams are: the supply of feed solution and eluent, the circulating of the liquid mixture, and the withdrawal of products (eluting phase; two to four or more products). The flow rate and the volumes of the different feeds and product fractions may be adjusted in accordance with the separation goals (yield, purity, capacity). The process commonly comprises three basic phases: feeding, elution and circulation. During the feeding phase, a feed solution, and possibly also an eluent during a simultaneous eluting phase, is introduced into predetermined partial packed beds, and simultaneously a product fraction or fractions are withdrawn. During the eluting phase, eluent is introduced into a predetermined partial packed bed or predetermined partial packed beds, and during these phases two, three or even four product fractions are withdrawn. During the circulating phase, no feed solution or eluent is supplied to the partial packed beds and no products are withdrawn.

The continuous simulated moving bed process has been disclosed in U.S. Pat. No. 2,985,589 (Broughton, et al.), for example. In accordance with this process, the mixture to be fractionated is introduced into one partial packed bed and eluent is introduced into another partial packed bed, and two product fractions are withdrawn substantially simultaneously. There are at least four partial packed beds, forming a single loop with continuous circulation, and the feed and product withdrawal points are shifted cyclically in the downstream direction in the packing material bed. A similar method is described in U.S. Pat. No. 4,412,866 (Schoenrock, et al.).

Sequential simulated moving bed processes are described in British application 2 240 053 and U.S. Pat. Nos. 4,332, 623 (Ando, et al.); 4,379,751 (Yoritomi, et al.) and 4,970, 002 (Ando et al.), for instance. A sequential simulated moving bed process applied to the recovery of betaine and sucrose from beet molasses is described in Applicants' Finnish Patent 86 416 (U.S. Pat. No. 5,127,957). In these methods, only one complete or essentially complete dry solids profile is circulated in the partial packing material loop.

Also, Applicants' copending Finnish applications 930 321 (filing date Jan. 26, 1993) and 932 108 (filing date May 19, 1993) relate to a sequential simulated moving bed method, the first applied to the fractionation of molasses and the latter to the fractionation of sulphite cooking liquor. As is described in these applications, the simulated moving bed method may include multiple loops; yet a single dry solids profile is circulated in each loop.

Finnish Patent 86 416 (U.S. Pat. No. 5,127,957) referred to above discloses a method for recovering betaine and sucrose from beet molasses employing a sequential simulated moving bed process. The chromatographic system comprises at least 3 chromatographic partial packed beds in series. In the method, betaine and sucrose are separated during the same sequence comprising a molasses feeding phase wherein the molasses feedstock is supplied to one of said partial packed beds and eluent water is supplied substantially simultaneously to another of said partial packed beds, an eluent feeding phase, and a circulating phase. These steps are repeated either once or several times during the sequence.

In the method disclosed in the above-stated Finnish application 930 321, the liquid flow is effected in a system comprising at least two partial packed beds, and the product or products are recovered during a multi-step sequence. A sequence comprises feeding, eluting and circulating phases. During the circulating phase, the liquid present in the partial packed beds with its dry solids profile is circulated in two or more loops comprising one, two or more partial packed beds. A loop may be closed or "open", in other words, when liquid is circulated in one loop, eluent can be introduced into the other loop and a product fraction can be withdrawn therefrom. During the feed and elution, the flow through the packing material beds may take place between successive loops, wherein the flows carry material from one loop to another. During the circulating phase, the loop is closed and separated from the other loops. Even in this disclosed method, only one dry solids profile is circulated in each loop.

The Applicants' Finnish application 941 866 discloses a simulated method bed method for the continuous fractionation of solutions, employing ion exchange resins of two or more different ionic forms, so that the dry solids profile formed upon passage of the solution through a chromatographic packing material having a first ionic form is passed to a chromatographic packing material having a second ionic form without the partially separated components being remixed, and/or that the concentration and pumping stages of the solution, included in the prior art methods for fractionating solutions with packed beds of two different ionic forms, can be avoided.

U.S. Pat. No. 5,198,120 (Masuda, et al.) discloses a method for fractionating a ternary or multi-component solution by a simulated moving bed method comprising a series of several columns. A circulation shut-off valve is "in between" the column series. The solution to be fractionated is supplied to the column located immediately after the shut-off valve in the downstream direction, and simultaneously one or more product fractions are withdrawn from a column located upstream. During a combined eluting and circulating phase, the solution is circulated in a loop comprising the entire column series.

European Application No. 663 224 (applicant Mitsubishi) discloses a method for fractionating a ternary or multi-component solution by a simulated moving bed method comprising a series of four columns. In this method, a loop may comprise two to four columns; yet only one dry solids profile is circulated in a loop.

In all prior art chromatographic simulated moving bed processes, only one separation profile is circulating in a loop at a given time. Accordingly, such prior art methods do not enable efficient use of the resin, resulting in lower capacity at a given product recovery, purity and resin volume.

Thus, there is a need to develop a new chromatographic simulated moving bed process which enables efficient use of the resin, resulting in higher capacity at a given product recovery, purity and resin volume.

SUMMARY OF THE INVENTION

The present invention relates to a method for fractionating a feed solution by a chromatographic simulated moving bed process in which the liquid flow is effected in a system comprising one or more columns containing one or more partial packed beds. The dissolved substances present in the feedstock are separated in the partial packed beds, and a separation (i.e. dry solids) profile is formed. The columns/partial packed beds form one or more loops. The novel method of the present invention is characterized in that the separation system comprises at least two separation profiles in the same loop. That is, in any given loop within the chromatographic system, at least two separation profiles are circulating through the loop.

A separation profile is formed by the feed solution and the dry substance recirculated. The separation profile comprises all constituents present in the feedstock, i.e. constituents having a low migration rate, constituents having an intermediate migration rate, and constituents having a high migration rate. Accordingly, the separation profile is a complete or an essentially complete dry solids profile. Preferably, part of the constituent having the highest migration rate is withdrawn prior to the circulation phase.

The generation and circulation of two separation profiles in the same loop is illustrated in the examples of the present invention wherein at least two portions of feed solution are added to the system prior to recovery of any product fraction from the loop. Stated another way, in any one loop there is present two dry substances profiles which move through the loop prior to any product recovery. In prior art processes, the feed solution is added and then it is allowed to pass through the entire system and a product fraction is thereafter recovered prior to adding further feed solution to the system. Thus, in prior art process only one separation profile is present in a given loop of the chromatographic system.

The novel chromatographic SMB method is capable of essentially improving the SMB separation capacity. Compared with the earlier chromatographic SMB processes, for example, the novel SMB method has afforded a separation capacity improved by several dozen percent for instance in molasses separation, while the product fraction performance characteristics have remained substantially the same.

DETAILED DESCRIPTION OF THE INVENTION

Figure 1:
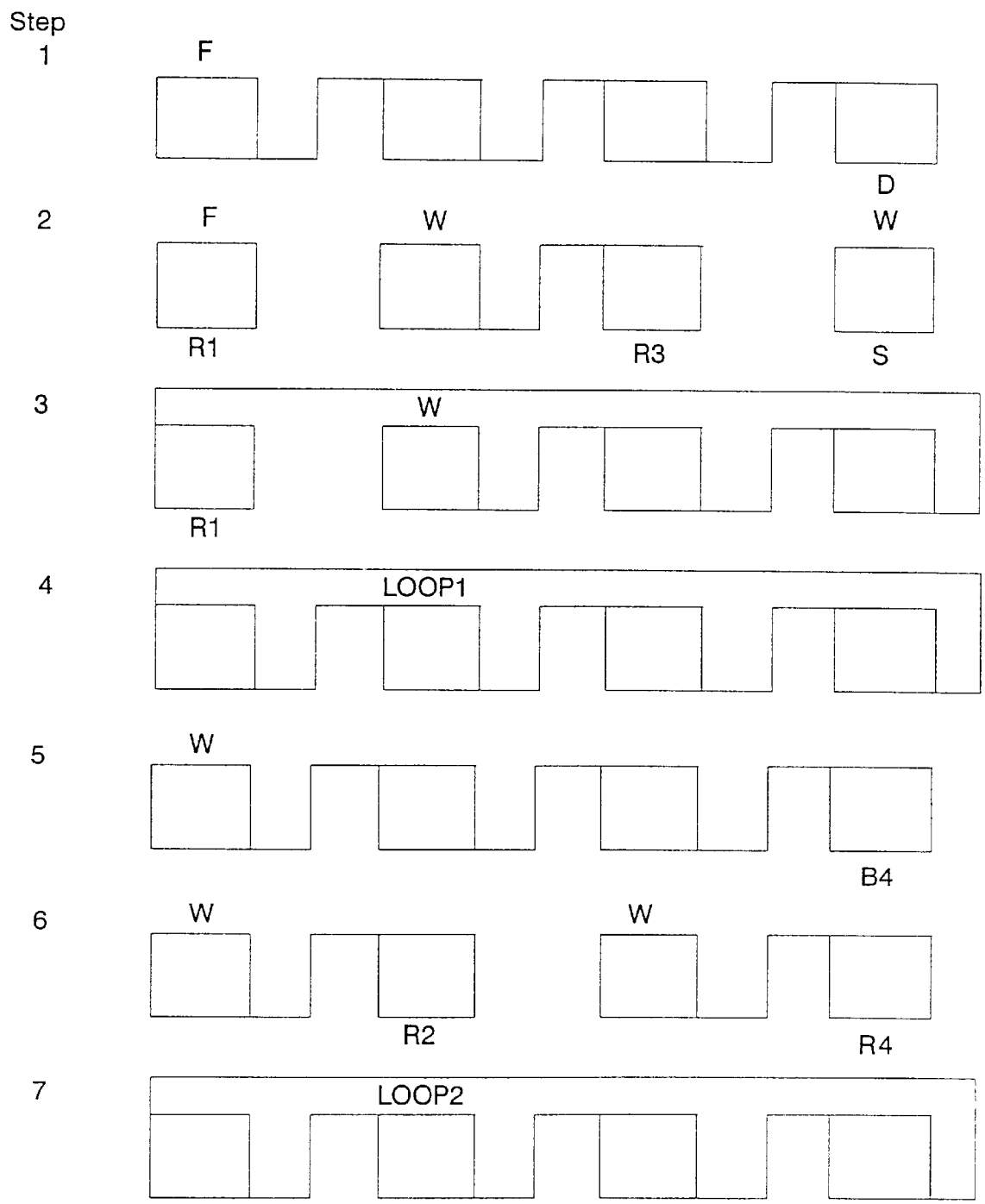
FIG. 1 is an illustration of one possible step sequence used in the present invention for beet molasses separation.

As stated above, the present invention provides a method for fractionating a feed solution containing at least one raw material into one or more, preferably two or more, product fractions by a chromatographic simulated moving bed (SMB) process. The method of the present invention can be used in a continuous SMB process, a sequential SMB process or a combination thereof (continuous and sequential).

In accordance with the method of the present invention, the separation system comprises at least two separation profiles in the same loop. The two profiles are formed by adding at least two portions of feed solution to the system before recovering any product fractions therefrom. Water may be used as an eluent and it can be added between or after the feed solution additions to ensure no overlap of the two separation profiles.

Suitable raw materials that may be present in the feed solution include: molasses, vinasse, fructose/glucose syrups, beet-derived juices, invert sugar mixtures, starch hydrolysates, wood hydrolysates, milk whey solutions and other lactose-containing solutions, solutions containing amino acids, fermentation broths containing various organic acids, such as citric acid, bagasse hydrolysates, and particularly solutions containing inositol, mannitol, sorbitol, xylitol, erythritol, glutamic acid and/or glycerol. Highly preferred raw materials include molasses, vinasse and sulphite cooking liquid.

The products that are recovered using the method of the present invention include: glucose, fructose, sucrose, betaine, inositol, mannitol, glycerol, xylitol, xylose, sorbitol, erythritol, organic acids, particularly amino acids, such as glutamic acid, raffinate, disaccharides and trisaccharides.

The chromatographic apparatus employed in the present invention comprises one column or several columns connected in series, fluid conduits connecting the columns, solution and eluent containers, feed and eluent conduits, recycle and feed pumps, heat exchangers, product fraction withdrawal conduits, and valves, flow and pressure regulators and on-line concentration, density, optical activity and conductivity meters. Such apparatuses are conventional and are well known to those skilled in the art. The process is proceeded within a state of equilibrium, and the progress of the separation process is monitored with a density meter. The separation is controlled by a microprocessor, which controls the volume flow rates and volumes of feeds, employing quantity/volume measuring devices, temperature controllers, valves and pumps.

The number of columns is 1 to 20, preferably 2 to 8. Preferably, a column comprises one or several separate partial packed beds.

A strong acid ion exchange resin, such as Finex V09C (manufacturer Finex Oy), Finex V13C (manufacturer Finex Oy), Finex CS 11 GC (manufacturer Finex Oy) or Purolite PCR 651 (manufacturer Purolite Co) is preferably used as a column packing material.

The eluent employed is preferably water. Other eluents well known to those skilled in the art are also contemplated herein.

The flow rate may range from 0.5 to 15 $m^3/hr./m^2$; preferably the flow rate is 3 to 10 $m^3/hr./m^2$. Other flow rates are also possible depending on the chromatographic system used.

In accordance with the present invention, the two separation profiles in the chromatography system are created similarly to the 1-profile process, by a sequence of steps, where liquids are fed into, and taken out from predetermined points of the system, or circulated within it. The main difference between the present invention and prior art processes is that two separation profiles are moving in one loop of the system. In the prior art, only one profile is present in any one loop. Again, the fact that two separation profiles are present in the same loop is verified by the fact that in the accompanying examples two portions of feed solution are added prior to recovering any product fraction from the loop. There can be two or three parallel operations within one step. In this case, the flow rate of the operations is controlled so that they end practically simultaneously. Thus, the flow in all columns is continuous except for short brakes during step shift. There are many possibilities to arrange the steps, according to process design and conditions. At least two columns are needed. In molasses separation 4–6 columns are practical in one series ("train") of columns, but not a necessity. Local conditions might call for another number of columns, especially if an existing system is updated to a 2-profile process.

In FIG. 1, the steps of a four column beet molasses separation process are illustrated. The flow scheme is highly simplified for clarity, and shows only the connections between individual columns. The following abbreviations are used in the step names for the liquids going in or coming out from the columns: F=Feed molasses, W=water, S=sucrose fraction or extract, R=raffinate or residual molasses, D=dilution fraction, which is used to dilute (80 RDS) molasses 1, 2, 3 and 4 are the column numbers.

The step numbering is in numerical sequence, and parallel operations are indicated by letters a, b and c. Step names indicate what is happening in the step: For example:

| Step | Name | Operation |
|---|---|---|
| 1 | F1-D4 | Feed molasses is fed into col. 1, D-fraction is taken out from col. 4 |
| 2a | F1-R1 | Feed molasses is fed into col. 1, and raffinate is taken out from col. 1 |
| 2b | W2-R3 | Water is fed into column 2, and raffinate is taken out from column 3 |
| 2c | W4-S4 | Water is fed into column 4, and sucrose is taken out from column 4 |
| 3 | W2-R1 | Water is fed into column 2, and raffinate is taken out from column 1. This is an example of a "tuning step", which can be used to control water amount in a certain column and/or a product fraction volume and composition. |
| 4 | Loop1 | Circulation in all columns; no products are taken out |
| 5 | W1-B4 | Water is fed into column 1, and betaine is taken out from column 4 |
| 6a | W1-R2 | Water is fed into column 1, and raffinate is taken out from column 2 |
| 6b | W3-R4 | Water is fed into column 3, and raffinate is taken out from column 4 |
| 7 | Loop 2 | As in step 4, Loop 1: circulation in all columns; no products are taken out |

This basic program works fine in perfect conditions, when all columns are filled with resin to optimal amount, and void volumes of the resin are the same in the column pairs 1 and 3 as well as in columns 2 and 4. However, in practice optimal conditions seldom prevail for extended periods, so some "tuning steps" can be used to enhance performance. They are usually much shorter, in time and volume, than the basic steps. Step 3 is an example of such a step.

As stated above, the process of the present invention improves the SMB separation capacity. The improved capacity is achieved by generating two separation profiles in the same loop.

The following examples are given to illustrate the scope of the present invention. Because these examples are given for illustrative purposes only, the invention embodied therein should not be limited thereto.

EXAMPLE 1

Two-Profile Separation from Molasses

The column series employed for the separation comprised eight separate partial packed beds, four of which formed a column in each case, i.e. there were two columns. Product fractions were withdrawn from column 1 and column 2, residual fractions were withdrawn from columns 1 and 2, but a sucrose and betaine fraction were withdrawn from column 2 only, as were the recycle fractions.

The test conditions are shown in Table 1A.

TABLE 1A

| Test conditions | |
|---|---|
| Separation temperature | 85° C. |
| Resin bed height | 14 m (7 m/column) |
| Column diameter | 11.1 cm |

A two-profile separation sequence was produced in the column series, wherein two separate separation profiles, i.e. essentially complete dry solids profiles, were simultaneously circulated in the separation process. The fractionation was performed in an eight-step sequence. The sequence had a cycle length of 38 minutes and comprised the following steps:

Step 1: 1.5 liters of feed solution was supplied to column 1 at a volumetric flow rate of 50 l/hr., and a corresponding amount of a recycle fraction was eluted from column 2.

Step 2: 5.5 liters of feed solution (continuation of feeding phase) was supplied to column 1 at a volumetric flow rate of 50 l/hr., and a corresponding amount of a sucrose fraction was eluted from column 2.

Step 3: 3.2 liters of eluent water was supplied to column 1 at a volumetric flow rate of 60 l/hr., and a corresponding amount of the remaining part of sucrose fraction was withdrawn (from column 2).

Step 4: The supply of eluent water to column 1 was continued (3.3 liters; 60 l/hr.), and a corresponding amount of a recycle fraction was eluted from column 2.

Step 5: The supply of eluent water to column 1 was continued (5.0 liters; 60 l/hr.), and a corresponding amount of a betaine fraction was eluted from column 2.

Step 6: The supply of eluent water to column 1 was continued (13.0 liters; 68 l/hr.), and a corresponding amount of a residual fraction was eluted from the same column. Simultaneously eluent water was also supplied to column 2 (10.0 liters; 73 l/hr.), and a corresponding amount of the remaining part of betaine fraction was withdrawn from the same column.

Step 7: The supply of eluent water to column 2 was continued (2.5 liters; 73 l/hr.) and a corresponding amount of a residual fraction was eluted from the same column.

Step 8: Circulation in the loop formed by columns 1 and 2 (6.0 liters; 75 l/hr.).

The sequence containing these steps was repeated eight times to equilibrate the system, whereafter the method proceeded in a state of equilibrium. In the state of equilibrium, samples were collected during one sequence.

The composition of the raw material of the feed solution is shown in Table 1B.

TABLE 1B

| Analysis of raw material | | | | |
|---|---|---|---|---|
| Composition, % of dry solids | | | | |
| Tri-saccharides | Sucrose | Monosaccharides | Betaine | Calcium |
| 2.8 | 57.6 | 0.6 | 7.6 | <0.04 |
| Dry solids content g/100 g | | | 52.7 | |
| pH | | | 9.4 | |
| Conductivity mS/cm | | | 13.7 | |

The separation resin employed as a packing material was Finex V09C, which was initially regenerated with sodium chloride (during the fractionation it was equilibrated by cations from the molasses). The analysis of the separation resin is shown in Table 1C.

TABLE 1C

| Analysis of separation resin | |
|---|---|
| Make | Finex V09C |
| DVB % | 5.5 |
| Capacity equiv/l | 1.56 |
| Mean bead size mm | 0.360 |

In equilibrium, the combined residual fraction had a dry solids content of 6.7 g/100 g, and the sucrose purity was 12.4% by weight. The sucrose fraction had a dry solids content of 19.1 g/100 g, and the sucrose purity was 90.1% by weight. The betaine fraction had a dry solids content of 4.4 g/100 g, and the betaine purity was 43.1% by weight.

EXAMPLE 2

Two-Profile Separation from Vinasse

The column series employed for the separation comprised three separate separation columns. Residual fractions were withdrawn from all columns, and a betaine fraction was withdrawn from column 3 only.

The test conditions are shown in Table 2A.

TABLE 2A

| Test conditions | |
|---|---|
| Separation temperature | 80° C. |
| Resin bed height | 10.5 m (3.5 m/column) |
| Column diameter | 20 cm |

A two-profile separation sequence was produced in the column series, wherein two separate separation profiles, i.e. essentially complete dry solids profiles were simultaneously circulated in the separation process. The fractionation was performed in a 7-step sequence. The sequence had a cycle length of about 58 minutes and comprised the following steps:

Step 1: 7 liters of feed solution was supplied to column 1 at a volumetric flow rate of 150 l/hr., and a corresponding amount of a residual fraction was eluted from column 2. Simultaneously 7 liters of eluent water was introduced into column 3 at a volumetric flow rate of 150 l/hr., and a corresponding amount of a betaine fraction was eluted from the same column.

Step 2: 5 liters of feed solution (continuation of feeding phase) was supplied to column 1 at a volumetric flow rate 150 l/hr., and a corresponding amount of a betaine fraction was eluted from column 3.

Step 3: 29 liters of feed solution was supplied to column 1, and a corresponding amount of residual fraction was eluted from the same column. Simultaneously 17 liters of eluent water was introduced into column 2 at a volumetric flow rate of 90 l/hr., and a corresponding amount of the remaining part of betaine fraction was withdrawn from column 3.

Step 4: The supply of eluent water to column 2 was continued (6 liters; 80 l/hr.) and a corresponding amount of residual fraction was eluted from column 1.

Step 5: Circulation in the loop formed by columns 1–3 (10 liters; 100 l/hr.).

Step 6: Eluent water was introduced into column 1 (33 liters; 100 l/hr.), and a corresponding amount of a residual fraction was eluted from column 3.

Step 7: Eluent water was introduced into column 3 (28 liters; 150 l/hr.), and a corresponding amount of a residual fraction was eluted from column 2.

A sequence comprising these steps was repeated eight times to equilibrate the system, whereafter the method proceeded in a state of equilibrium. In the state of equilibrium, samples were collected during one sequence.

The composition of the raw material of the feed solution is shown in Table 2B.

TABLE 2B

Analysis of raw material

| Composition, % of dry solids | |
|---|---|
| Betaine | 13.8 |
| Dry solids content g/100 g | 53.8 |
| pH | 7.1 |
| Conductivity mS/cm | 46.5 |

The separation resin employed as a packing material was Finex V13C, which was initially regenerated with sodium chloride (during the fractionation it was equilibrated by cations from the vinasse). The analysis of the separation resin is shown in Table 2C.

TABLE 2C

Analysis of separation resin

| Make | Finex V13C |
|---|---|
| DVB % | 8.0 |
| Capacity equiv/l | 1.8 |
| Mean bead size mm | 0.34 |

In equilibrium, the betaine fraction had a dry solids content of 22.4%, and the betaine purity was 48.3 by weight. The combined residual fraction had a dry solids content of 18.4%, and the betaine purity was 2.3% by weight.

EXAMPLE 3

Two-Profile Separation from Glucose/Fructose Mixture

The column series employed for the separation comprised four separate separation columns. Product fractions were withdrawn from all columns.

The test conditions are shown in Table 3A.

TABLE 3A

Test conditions

| Separation temperature | 65° C. |
|---|---|
| Resin bed height | 11.2 m (2.8 m/column) |
| Column diameter | 20 cm |

A two-profile separation sequence was produced in the column series, wherein two separate separation profiles, i.e. essentially complete dry solids profiles were simultaneously circulated in the separation process. The fractionation was performed in a four-step sequence. The sequence had a cycle length of 74 minutes and comprised the following steps:

Step 1: 18 liters of a feed solution was supplied to columns 1 and 3 at a volumetric flow rate of 120 l/hr., and a corresponding amount of glucose fraction was eluted from the same columns.

Step 2: 8 liters of eluent water was supplied to columns 2 and 4 at a volumetric flow rate of 120 l/hr., and a corresponding amount of a glucose fraction was eluted from columns 3 and 1.

Step 3: 30 liters of eluent water was supplied to columns 2 and 4, and a corresponding amount of a fructose fraction was eluted from the same columns.

Step 4: Circulation in the loop formed by columns 1–4 (106 liters; 130 l/hr.).

The sequence containing these steps was repeated eight times to equilibrate the system, whereafter the method proceeded in a state of equilibrium. In the state of equilibrium, samples were collected during one sequence.

The composition of the raw material of the feed solution is shown in Table 3B.

TABLE 3B

Analysis of raw material

| Composition, % of dry solids | | | |
|---|---|---|---|
| Glucose | 49.2 | Fructose | 49.5 |
| Dry solids content g/100 g | | 50 | |

The separation resin employed as a packing material was Finex CS 11 GC, which was regenerated with calcium chloride. The analysis of the separation resin is shown in Table 3C.

TABLE 3C

Analysis of separation resin

| Make | Finex CS 11 GC |
|---|---|
| DVB % | 5.5 |
| Capacity equiv/l | 1.5 |
| Mean bead size mm | 0.310 |

In equilibrium, the combined glucose fraction had a dry solids content of 23.3 g/100 g, and the glucose purity was 96.7%. by weight. The combined fructose fraction had a dry solids content of 20.3 g/100 g, and the fructose purity was 99.7%.

EXAMPLE 4

Three-Profile Separation from Molasses

The column series employed for the separation comprised three separate separation columns. Residual fractions were withdrawn from all columns, and sucrose, recycle and betaine fractions were withdrawn from column 1.

The test conditions are shown in Table 4A.

TABLE 4A

Test conditions

| | |
|---|---|
| Separation temperature | 80° C. |
| Resin bed height | 15.3 m (5.1 m/column) |
| Column diameter | 20 cm |

A three-profile separation sequence was produced in the column series, wherein three separate separation profiles, i.e. essentially complete dry solids profiles were simultaneously circulated in the separation process. The fractionation was performed in an eight-step sequence. The sequence had a cycle length of 43 minutes and comprised the following steps:

Step 1: 9 liters of a feed solution was supplied to column 2 at a volumetric flow rate of 110 l/hr., and a corresponding amount of a recycle fraction was withdrawn from column 1.

Step 2: 11 liters of a feed solution (continuation of feeding phase) was supplied to column 2 at a volumetric flow rate of 110 l/hr., and a corresponding amount of a sucrose fraction was eluted from column 1.

Step 3: 16 liters of eluent water was supplied to column 2 at a volumetric flow rate of 110 l/hr., and a corresponding amount of sucrose fraction was eluted from column 1.

Step 4: 5.5 liters of eluent water was supplied to column 2 at a volumetric flow rate of 110 l/hr., and a corresponding amount of a recycle fraction was withdrawn from column 1.

Step 5: The supply of eluent water to column 2 was continued (9 liters; 110 l/hr.), and a corresponding amount of a betaine fraction was eluted from column 1.

Step 6: Eluent water was introduced into columns 1, 2 and 3 (5 liters into each at a volumetric flow rate of 120 l/hr.); a corresponding amount of a betaine fraction was eluted from column 1 and a corresponding amount of residual fractions was eluted from columns 2 and 3.

Step 7: The supply of eluent water to columns 1, 2 and 3 was continued (15 liters at 100 l/hr. to column 1, 21 liters at 140 l/hr. to column 2, 21 liters at 140 l/hr. to column 3), and a corresponding amount of residual fractions was eluted from columns 1, 2 and 3.

Step 8: Circulation in the loop formed by columns 1–3 (4 liters; 120 l/hr.).

The sequence containing these steps was repeated eight times to equilibrate the system, whereafter the method proceeded in a state of equilibrium. In the state of equilibrium, samples were collected during one sequence.

The composition of the raw material of the feed solution is shown in Table 4B.

TABLE 4B

Analysis of raw material

Composition, % of raw material

| Tri-saccharides | Sucrose | Betaine | Calcium |
|---|---|---|---|
| 3.9 | 60.4 | 5.1 | <0.04 |

| Dry solids content g/100 g | 58.5 |
| Solids | <0.1 vol. I |

TABLE 4B-continued

Analysis of raw material

| | |
|---|---|
| pH | 9.0 |
| Conductivity mS/cm | 23.1 |

The separation resin employed as a packing material was Finex V09C, which was initially regenerated with sodium chloride (during the fractionation it was equilibrated by cations from the molasses). The analysis of the separation resin is shown in Table 4C.

TABLE 4C

Analysis of separation resin

| | |
|---|---|
| Make | Finex VO9C |
| DVB % | 5.5 |
| Capacity equiv/l | 1.5 |
| Mean bead size mm | 0.310 |

In equilibrium, the combined sucrose fraction had a dry solids content of 22 g/100 ml, and the sucrose purity was 92.7% by weight. The combined betaine fraction had a dry solids content of 5.2 g/100 ml, and the betaine purity was 36.6% by weight. The combined residual fraction had a dry solids content of 8.2 g/100 ml.

EXAMPLE 5

Two-Profile Continuous Separation from Molasses

The column used for the separation comprised 14 separate partial packed beds between which a liquid pervious but resin-retaining exchange plate was provided; a feeding and withdrawal apparatus was disposed on top of the exchange plate. The column had a diameter of 0.2 m, and the bed had a height of 14 m (1 m per partial packed bed). The step length was 310 s, which for the feed was divided into two parts, i.e. feeding 280 s and rinsing of the pipe system and the feed and withdrawal apparatus 30 s. The cycle length was 4 340 s.

The separation resin employed as a packing material was Purolite PCR 651, which was initially regenerated with sodium chloride (during the fractionation it was equilibrated by cations from the molasses). The analysis of the separation resin is shown in Table 5A.

TABLE 5A

Analysis of separation resin

| | |
|---|---|
| Make | Purolite PCR 651 |
| DVB % | 5.5 |
| Capacity equiv/l | 1.5 |
| Mean bead size mm | 0.340 |

The composition of the raw material of the feed solution is shown in Table 5B.

TABLE 5B

Analysis of raw material

Composition, % of dry solids

| | |
|---|---|
| Sucrose | 59 |
| Dry solids content g/100 g | 59 |

TABLE 5B-continued

Analysis of raw material

| | |
|---|---|
| pH | 9.2 |
| Conductivity mS/cm | 13.8 |

The sequence comprised 14 steps. The situation during one step was the following:

Sucrose fractions were withdrawn from partial packed beds 2 and 9, and residual fractions were withdrawn from partial packed beds 6 and 13.

Feed solution and rinsing solution were introduced into partial packed beds 5 and 12, and eluent water was introduced into partial packed beds 1 and 8.

Partial packed beds 1 and 2 (and 8 and 9 respectively) of the column formed a sucrose elution zone where the volumetric flow rate was 214 l/hr. The sucrose fraction was withdrawn at a volumetric flow rate of 19.6 l/hr.

Partial packed beds 3 and 4 (and 10 and 11 respectively) formed an extraction zone where the volumetric flow rate was 194 l/hr. Partial packed beds 5 and 6 (and 12 and 13 respectively) formed an ion exclusion zone where the volumetric flow rate was 206 l/hr. The feed solution was introduced between these zones (volumetric flow rate 12.5 l/hr.), as was the rinsing solution (volumetric flow rate 12.5 l/hr.).

Partial packed bed 7 (and 14 respectively) formed a transition zone where the volumetric flow rate was 140 l/hr.

The residual fraction was withdrawn from between the ion exclusion zone and the transition zone (volumetric flow rate 66 l/hr.).

The feed and withdrawal points were shifted cyclically at intervals of 310 seconds for one partial packed bed in the flow direction (correspondingly, the elation, extraction, ion exclusion and transition zones were shifted for one partial packed bed).

In equilibrium, the sucrose fraction had a dry solids content of 27.1% and a sucrose purity of 87.8%. The residual fraction had a dry solids content of 5.5%. and a sucrose purity of 16.4%.

EXAMPLE 6

Two-Profile Separation from Xylitol Run-Off

The column series employed for the separation comprised three columns. Product fractions were withdrawn from column 1 and residual fractions from columns 1, 2 and 3.

The test conditions are shown in Table 6A.

TABLE 6A

Test conditions

| | |
|---|---|
| Separation temperature | 70° C. |
| Resin bed height | 11.1 m (3.8 m/column) |
| Column diameter | 20 cm |
| Number of columns | 3 |

A two-profile separation sequence was produced in the column series, wherein two separate separation profiles, i.e. essentially complete dry solids profiles, were simultaneously circulated in the separation process. The fractionation was performed in an eight-step sequence. The sequence had a cycle length of 87 minutes and comprised the following steps:

Step 1: 15.0 liters of feed solution was supplied to the top of column 1 at a volumetric flow rate of 52 l/hr., and a corresponding amount of a recycle fraction was eluted from column 2. Simultaneously eluent water was supplied to column 3 (15.0 liters; 160 l/hr.) and a corresponding amount of the xylitol fraction from the second profile was withdrawn from the same column.

Step 2: 10.0 liters of feed solution (continuation of feeding phase) was supplied to column 1 at a volumetric flow rate of 125 l/hr., and a corresponding amount of a xylitol fraction was eluted from column 3.

Step 3: Circulation in the loop formed by columns 1 to 3 (15.0 liters; 125 l/hr.).

Step 4: Eluent water was supplied to column 2 (15.0 liters; 125 l/hr.), and a corresponding amount of a recycle fraction was eluted from column 1.

Step 5: The supply of eluent water to column 2 was continued (40.0 liters; 140 l/hr), and a corresponding amount of a recycle fraction was eluted from column 3. Simultaneously eluent water was supplied to column 1 (15.0 liters; 55 l/hr.) and a corresponding amount of a recycle fraction was eluted from the same column.

Step 6: The supply of eluent water to column 1 was continued (15.0 liters; 125 l/hr.), and a corresponding amount of a residual fraction was eluted from column 3.

Step 7: Circulation in the loop formed by columns 1 to 3 (18.0 liters; 125 l/hr.).

Step 8: Eluent water was supplied to column 3 (20.0 liters; 125 l/hr.), and a corresponding amount of a residual fraction was eluted from column 2.

The sequence containing these steps was repeated eight times to equilibrate the system, whereafter the method proceeded in a state of equilibrium. In the state of equilibrium, samples were collected during one sequence.

The composition of the raw material of the feed solution is shown in Table 6B. Before the separation, the raw material was filtered and the concentration of the feed solution was adjusted to 50 g/100 g.

TABLE 6B

Analysis of raw material

| Composition, % of dry solids | | | | | |
|---|---|---|---|---|---|
| Glycerol | Mannitol | Rhamnitol | Xylitol | Sorbitol | Others |
| 2.5 | 18.2 | 1.1 | 43.0 | 7.8 | 28.5 |

| | |
|---|---|
| Dry solids content g/100 g | 50.6 |
| pH | 5.2 |
| Conductivity mS/cm | 0.3 |

The separation resin employed as a packing material was Finex CS 13 GC (a polystyrene matrix crosslinked with divinylbenzene; manufacturer Finex Oy, Finland), which was initially regenerated with calcium chloride (during the fractionation it was equilibrated by cations from the runoff). The analysis of the separation resin is shown in Table 6C.

TABLE 6C

Analysis of separation resin

| | |
|---|---|
| Make | Finex CS 13 GC |
| DVB % | 6.5 |
| Capacity equiv/l | 1.65 |
| Mean bead size mm | 0.41 |

In equilibrium, the combined residual fraction had a dry solids content of 7.7 g/100 g, and the xylitol concentration was 19.1% by weight. The xylitol fraction had a dry solids content of 16.5 g/100 g, and the xylitol purity was 66.2% by weight and the xylitol yield 80.6% by weight.

The above embodiments and examples are given to illustrate the scope and spirit of the invention. These embodiments and examples will make apparent to those skilled in the art other embodiment and examples. These other embodiments and examples are within the contemplation of the present invention; therefore, the instant invention should be limited only by the appended claims.

What is claimed is:

1. A method of recovery of two or more products from a feed solution containing at least one raw material, said method comprising:

maintaining one or more loops within a chromatographic system comprising one or more columns, said system having two or more separation profiles within the same loop; and recovering two or more product fractions from said at least one raw material via chromatographic separation.

2. The method of claim 1 wherein said recovery of two or more product fractions is accomplished within the same loop.

3. The method of claim 2 wherein said chromatographic system contains 2–8 columns.

4. The method of claim 1 wherein said chromatographic separation comprises simulated moving bed (SMB) chromatography.

5. The method of claim 1 wherein said chromatographic system contains less than 20 columns.

6. The method of claim 1 wherein said chromatographic system is capable of 2–3 parallel operations within one step.

7. The method of claim 1 further comprising containment means which includes more than one containment vessel.

8. The method of claim 7 further comprising a containment vessel which maintains feed solution, eluent, or any combination thereof.

9. A method of improving the capacity of a molasses chromatographic separation procedure, said method comprising:

fractioning a feed solution containing at least one molasses containing raw material into two or more product fractions by a chromatographic simulated moving bed (SMB) process in which liquid flow is effected in a chromatographic system comprising one or more columns containing one or more partial packed beds, said one or more columns form one or more loops within the chromatography system wherein at least two separation profiles are generated within the same loop.

10. The method of claim 9 wherein said two or more product fractions include sucrose and betaine.

11. The method of claim 10 wherein said product fractions have a purity of at least 40%.

12. The method of claim 11 wherein at least one of said product fractions has a purity of greater than 90%.

* * * * *